G. T. MERRITT.
TRAP NEST FOR FOWLS.
APPLICATION FILED AUG. 17, 1909.

990,821.

Patented Apr. 25, 1911.
2 SHEETS—SHEET 1.

Witnesses

Inventor
G. T. Merritt

By ____, Attorneys

THE NORRIS PETERS CO., WASHINGTON, D. C.

G. T. MERRITT.
TRAP NEST FOR FOWLS.
APPLICATION FILED AUG. 17, 1909.
990,821.
Patented Apr. 25, 1911.
2 SHEETS—SHEET 2.
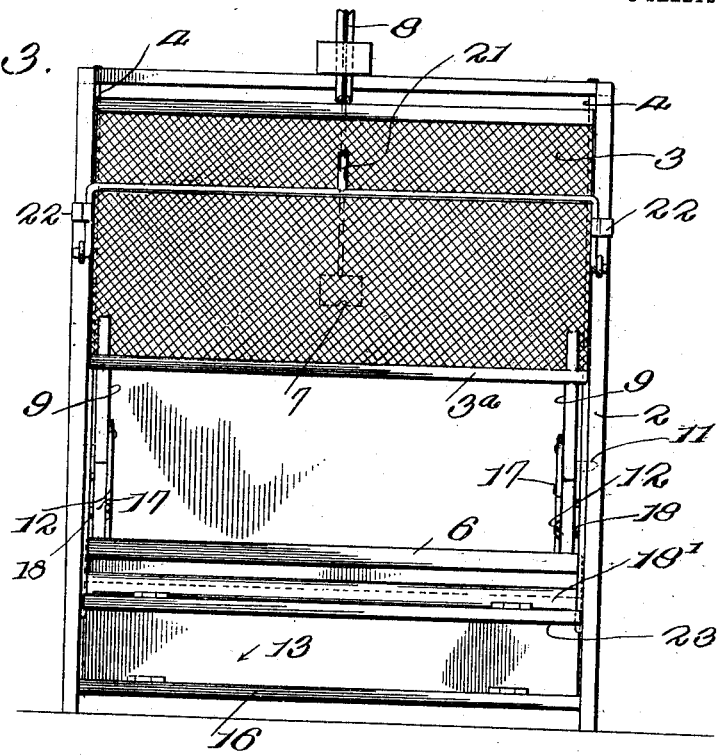
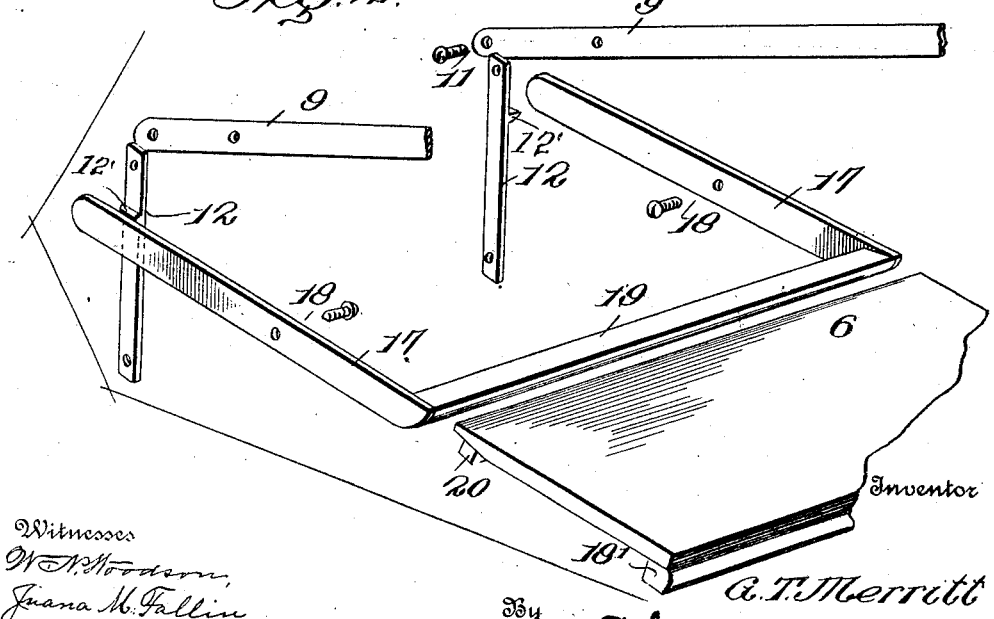

UNITED STATES PATENT OFFICE.

GEORGE T. MERRITT, OF ATLANTA, GEORGIA, ASSIGNOR TO EUGENE RAGLAND, OF ATLANTA, GEORGIA.

TRAP-NEST FOR FOWLS.

990,821.  Specification of Letters Patent.  Patented Apr. 25, 1911.

Application filed August 17, 1909. Serial No. 513,264.

*To all whom it may concern:*

Be it known that I, GEORGE T. MERRITT, citizen of the United States, residing at Atlanta, in the county of Fulton and State of Georgia, have invented certain new and useful Improvements in Trap - Nests for Fowls, of which the following is a specification.

This invention relates to nests for fowls and its object is to provide a nest wherein the hen or other fowl will be protected from intrusion when setting, and which will yet allow the hen to have free ingress and egress at all times.

A further object is to provide means adapted to be used when desired or moved out of operative position for trapping the hen and preventing her leaving the nest after laying an egg. This is often very desirable, as when it is desired to get a setting of eggs from some particular breed of fowl, as the hen can not leave the nest coop until the door has been manually opened, and the eggs in the nest can be identified with the particular hen and marked for identification.

In general my improved trap nest includes a housing or coop inclosing the nest and provided with a trap door which shall be automatically closed by the settling of a fowl upon the nest box or nest proper and automatically opened when the hen has left the nest, thus allowing the hen to leave the coop whenever she desires, unless the door be held closed by a snap latch provided for the purpose. This latch may be turned so as to hold the door when it closes after the hen enters the coop or may be turned up out of the way. Provision is also made for closing the space between the lower edge of the door and the bottom of the coop so that the coop may be entirely closed at night to prevent the ingress of rats, weasels or other animals.

Figure 1:
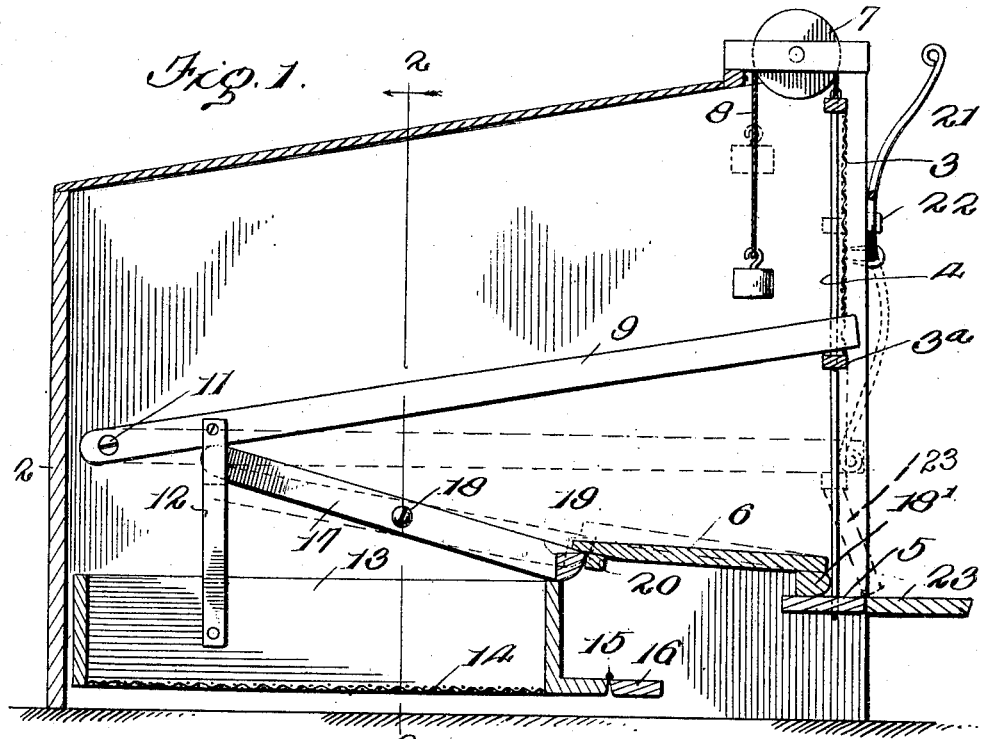
Figure 2:
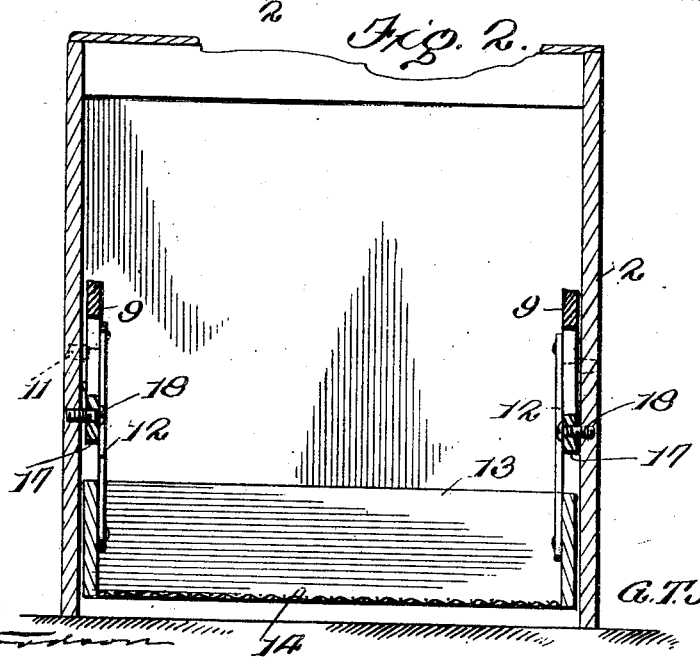

In the drawings: Figure 1 is a longitudinal vertical section of my improved nesting coop; Fig. 2 is a vertical transverse section on the line 2—2 of Fig. 1; Fig. 3 is a front elevation, and Fig. 4 is a perspective detail of the operating levers detached from the coop.

Corresponding and like parts are referred to in the following description and indicated in all the views of the drawings by the same reference characters.

Referring to these figures, 2 designates a coop or housing shown as rectangular in plan, closed at its top, open at one end and having a vertically sliding door 3 closing the open end. This door is preferably composed of a frame supporting a body of wire netting so as to permit of proper ventilation of the coop. While the door may be mounted in any desired manner, I preferably provide guide rods 4 attached to the side of the coop, but spaced therefrom in any desired manner. The lower ends of the guide rods 4 are carried in a cross bar 5 which extends across the front of the housing from side to side and which is raised somewhat above the bottom of the coop. It will be seen from the drawings that the door does not close to the cross bar, but that a space is left between the cross bar and the lower edge of the door. This space is for the purpose of allowing the hen to see an opening from the coop and encouraging her to jump from the nest to the operating platform 6. The door is preferably counterbalanced, and for this purpose I provide a pulley 7 over which a cord 8 passes, the end of the cord being weighted. As a means of automatically operating the door, I provide the opposed levers 9 which at their forward ends are connected to the door frame by resting upon the cross-bars $3^a$ and at their rear ends extend back to a fulcrum 11 formed in any desired manner. Depending from near the rear end of each lever 9 is the link 12 which at its lower end is pivoted to a nest box 13 whose underside is preferably made of wire netting 14. The forward end of the nest box is hinged at 15 to a cross bar 16, the cross bar being attached to the sides of the coop. Also engaged with the links 12 below the levers 9, are the levers 17. These levers are pivoted at their middles, as at 18, to the sides of the coop and at their forward ends are joined by a cross bar 19 whose forward end is rounded. The rear ends of these levers rest upon outwardly projecting lugs 12′ on the links 12, the levers being carried between these lugs and the edges of the levers 9 thus permitting of a rear shifting movement between the links 12 and the levers 9. Supported upon the cross bar 5 and upon the cross bar 19 is the platform 6. The forward end of this platform has attached to it transversely the rounded strip 18′ which forms a rounded bearing for the forward end of the platform upon the upper face of the cross bar 5. The rear end of the platform is also provided with a bracing strip 20 against which the rounded face of the cross bar 19 contacts. It will be seen that when the door 3 is raised that the platform will also be raised and that when the nest box 13 is lowered that the levers 9 will be lowered, drawing upon and closing the door 3, and through the levers 17 raising the platform. Thus when a hen enters the coop and settles in the nest 13, the door will be immediately closed, but when the hen leaves the nest and rests upon the platform 6, her weight will operate the lever 17, moving upward the link 12, raising the levers 9 and opening the door, thus permitting the egress of the hen.

It is often desirable, as before stated, to trap the hen after an egg has been laid or for other purposes and to prevent her leaving the coop until desired. For this purpose I provide the latch 21 which is pivoted at its upper end to the front of the coop and is adapted to be turned down into the position shown in dotted lines in Fig. 1, so as to engage with the lower cross bar 3ª of the door when the door is lowered, and preventing any raising of the door. The latch 21 is preferably made of somewhat resilient wire and its lower end is bent or formed in any suitable manner to engage the cross bar 3ª. A resilient clip 22 is attached to the front of the coop so that the latch may be held in a raised position, as shown in full lines in Fig. 3. This clip is shown as consisting of two opposed resilient fingers, but any desired means for this purpose may be used.

The counterweights on the cord 8 are, of course, detachable and interchangeable so that the door and platform may be counterbalanced to operate with any desired weight of hen. This is necessary where hens of different breeds are liable to use these nests. A door which could be operated by the weight of a Plymouth Rock alone, could not be operated by a small bantam, particularly where the nest box is full of eggs. While I have shown the door as counterweighted by a cord and passing over a pulley and provided with interchangeable weights, I wish it distinctly understood that I may counterbalance the door in any other desired manner and use any other means of changing the counterbalancing weight.

As before noted the door 3 does not close against the platform 6 or against the crossbar 5, but a space is left sufficient to encourage the hen to leave the nest when she desires to do so during the day and thus gain egress from the coop. This opening would permit the entrance of rats and other chicken enemies at night, and to prevent this I provide a door-like platform 23 which is hinged at its lower end to the cross-bar 5 and is adapted to be turned up at night, thus preventing the intrusion of rodents. When the platform 23 is turned up the lower edge of the sliding door 3 rests thereon so that the platform 23 will be held in its closed position by the weight of the sliding door. It is so lightly held, however, that it does not interfere with the egress of the hen. When she steps upon the platform 6 the door 3 will rise and the extra door or platform 23 having no latch can be easily pushed forward by the hen, whereupon it will fall in the position shown in full lines in Fig. 1, and the hen may walk out. The platform 23 is held in its lowered position by any suitable stop, as for instance, the edge of the cross-bar 5. In its lowered position it acts as a platform or landing for the fowls.

It will be seen that the platform 23 which forms the auxiliary door provides means for entirely closing the coop and preventing the entrance of animals into the coop as the door is turned to its closed position.

While I have shown what I believe to be the main features of my invention in their preferable forms, I do not wish to be limited to this as it is obvious that many minor changes may be made without departing from the spirit of the invention.

Having thus described the invention, what is claimed as new is:

1. A trap nest for fowls, including a coop open at one end, a vertically moving door closing the open end, an operating platform, a nest box, a connection between the platform and the door, operating to raise the door to open position when the weight of a fowl rests upon the platform, and between the nest box and the door whereby the weight of a fowl in the nest box shall lower the door, and a rotatable spring latch permitting the door to move to its closed position, but afterward engaging to prevent the opening of the door.

2. A trap nest for fowls, including a coop open at one end, a vertically moving door closing the open end and having a crossbar at its lower edge, an operating platform, a nest box, a connection between the platform and the door, operating to raise the door to an open position when the weight of a fowl rests upon the platform, and between the nest box and the door whereby the weight of a fowl in the nest box shall lower the door to a closed position, a spring latch permitting the door to move to its closed position, but afterward engaging the crossbar on the door to prevent the opening of the door, said spring latch being hinged so as to be movable out of its door engaging position, and means for holding the latch raised.

3. A trap nest for fowls, including a coop open at one end, a vertically sliding door closing the open end, a counterbalance for the door normally holding it in a raised position, a lever attached at one end to the door and pivoted to a fixed point at its other end, a vertically movable nest box, a connection between the said nest box and the lever and engaging with the lever at a point intermediate its fulcrum and its free end, a vertically movable platform arranged between the nest box and the door, and means whereby the weight of a fowl upon said platform shall operate the lever to open the door.

4. A trap nest for fowls, including a coop open at one end, a vertically sliding door closing the open end of the coop, a counterbalance for the door, opposed levers attached at their forward end to the door and extending rearward, said levers being pivoted at their rear end, a nest box hinged at one end to move vertically, links connecting the nest box with the levers, a vertically movable platform having its forward end arranged within the door opening, levers pivoted intermediate of their lengths upon one end of which said platform rests, said levers being connected at their rear ends to said links, and means for latching the door in its lowered position.

5. A trap nest for fowls, including a coop open at one end, a sliding door closing the open end, a counterbalance for the door, a movable nest box, a lever attached to the door and connected to the nest for closing the door when a hen enters the nest, a cross bar extending across the lower portion of the door opening, but below the lowest position of the door, a platform supported on the cross bar and adapted to raise the door when a fowl rests thereon, and a platform hinged to said cross bar adapted to fall into a horizontal position in front of the coop, said platform being adapted to be turned upward into place beneath the lower edge of the door to close the space between the door and the cross bar.

6. A trap nest for fowls including a coop open at one end, a vertically sliding door closing the open end, a nest box, a connection between the nest box and the door whereby a weight upon the nest box shall lower the door and permit the door to be raised when the weight is relieved, and a platform hingedly mounted upon the front of the coop at the bottom of the door opening and adapted to be turned up into position to partly close the door opening and to be engaged by and held by the descent of the door, but be released when the door rises.

In testimony whereof I affix my signature in presence of two witnesses.

GEORGE T. MERRITT. [L. S.]

Witnesses:
  ALFREDO BARILI, Jr.,
  S. D. TROWBRIDGE.

---

Copies of this patent may be obtained for five cents each, by addressing the "Commissioner of Patents, Washington, D. C."